United States Patent
Belmares et al.

(10) Patent No.: US 6,869,680 B2
(45) Date of Patent: Mar. 22, 2005

(54) STAIN RESISTANT ACOUSTICAL PANELS

(75) Inventors: Hector Belmares, Lancaster, PA (US); Alejandrino Vazquez, Lancaster, PA (US); Kenneth G. Caldwell, Mountville, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 10/698,123

(22) Filed: Oct. 31, 2003

(65) Prior Publication Data

US 2004/0121136 A1 Jun. 24, 2004

Related U.S. Application Data

(63) Continuation-in-part of application No. 10/033,626, filed on Dec. 27, 2001, now abandoned.

(51) Int. Cl.[7] .................................................. D02G 3/00
(52) U.S. Cl. .................. 428/364; 428/304.4; 428/317.9
(58) Field of Search ................................ 428/166, 172, 428/304.4, 364, 317.9, 361, 375, 403; 106/214; 524/13, 544, 514, 502, 527, 523

(56) References Cited

U.S. PATENT DOCUMENTS

| | | | |
|---|---|---|---|
| 4,301,212 A | 11/1981 | Cohnen et al. | 428/412 |
| 4,355,065 A | 10/1982 | DeMott | 428/195 |
| 4,610,918 A | 9/1986 | Effenberger et al. | 442/68 |
| 4,865,903 A | 9/1989 | Adiletta | 428/215 |
| 4,946,889 A | 8/1990 | Nishioka | 524/544 |
| 4,963,603 A | 10/1990 | Felegi, Jr. et al. | 524/13 |
| 5,034,460 A | 7/1991 | Nishioka | 525/72 |
| 5,277,762 A | 1/1994 | Felegi, Jr. et al. | 162/145 |
| 5,348,621 A | 9/1994 | Rudy | 162/100 |
| 5,395,438 A | 3/1995 | Baig et al. | 106/214 |
| 5,478,414 A | 12/1995 | Mozelewski et al. | 148/265 |
| 5,560,978 A | 10/1996 | Leech | 428/141 |
| 5,798,415 A | 8/1998 | Corpart et al. | 525/129 |
| 5,854,364 A | 12/1998 | Senninger et al. | 526/192 |
| 5,880,204 A | 3/1999 | McCarthy et al. | 524/520 |
| 5,911,818 A * | 6/1999 | Baig | 106/698 |
| 6,387,172 B1 * | 5/2002 | Yu et al. | 106/680 |
| 6,481,171 B2 * | 11/2002 | Yu et al. | 52/443 |
| 6,586,520 B1 * | 7/2003 | Canorro et al. | 524/514 |

* cited by examiner

*Primary Examiner*—Merrick Dixon

(57) ABSTRACT

A stain resistant acoustical panel which incorporates within its structure a relatively small quantity of latex which forms an ultra thin coating within the panel such that water may pass through the inner structure of the panel. The panel may further include a primer coating applied to the facing side of the panel to prevent water stains. The coating contains a chelating agent which provides stain resistance to the coated face of the panel. Additionally, the panel may incorporate both latex within its structure and a primer coating comprising a chelating agent.

9 Claims, No Drawings

STAIN RESISTANT ACOUSTICAL PANELS

PRIORITY CLAIM

This is a continuation-in-part application claiming priority from prior application Ser. No. 10/033,626 filed Dec. 27, 2001, now abn, the prior application being incorporated herein by reference.

BACKGROUND

The present invention generally relates to acoustical panels and in particular it relates to stain resistant acoustical tiles.

Acoustical panels are often prone to stains caused by water soaking into the panel. This is especially true for ceiling panels stained by water dripping from a leaky roof. Such water damage leaves a permanent visible mark on the front face of the acoustical panel which destroys the aesthetics of the overall ceiling panel grid. Water stains occur most often when starch or starch mixtures are used as internal binders within the panel. Staining is believed to be the result of scorched starch, iron compounds and dyes from recycled cellulosic fibers from newspapers ("newsprint") being brought to the front face of the panel by water being absorbed by the panel.

Acoustical panels typically comprise binders and fibers. Starch is the most common binder used in the formation of acoustical panels. The fibers added include mineral fiber (mineral wool), glass fiber, texpanel fiber and natural fibers such as cellulose from newsprint. Fibers contribute to the wet strength of the board as it is converted from the aqueous slurry to the substantially solid cake (wet formation) before forming the finished panel. Newsprint contributes significantly to the staining of the panel. Acoustical panels may also include clays, expanded perlite, dolomite, calcium carbonate, calcium sulfate hemihydrate, flocculants and surface active agents.

Additional binders include latexes which have been added to improve panel sag resistance under high humidity since starch is hydrophilic and its binding properties degrade in the presence of high humidity. Typically, latex is added as part of the binder mix comprising both starch and latex. The latex component commonly comprises the majority of the binder mix. Latexes are hydrophobic and are not susceptible to moisture.

Current efforts to prevent water damage to acoustical panels are directed at preventing the water from entering the inner structure of the panel. One of the most common methods is the incorporation of latexes as a binder into the panel such that water is blocked from entering the inner structure of the panel. Additionally, an impermeable backing may be applied to the back side of the panel to prevent water from being absorbed into the panel. Unfortunately, such methods only redirect the water to the outer edges of the panel which can cause a "picture frame effect" to form on the facing of the panel. The "picture frame effect" results in a visible water stain framing the outer edges of the front face. This effect can be caused by water being absorbed at the edges of the panel and by the rusting of the support grid of the ceiling system.

SUMMARY

The present invention includes a stain resistant acoustical panel. The panel may incorporate within its structure a relatively small quantity of latex which forms an ultra thin coating within the fibrous panel such that water may pass through the inner structure of the panel. The panel also provides a mechanism for leak detection since water is allowed to flow through the panel where the leak can be detected long before a resulting stain is visible in a conventional panel. In addition, the panel may have a primer coating applied to the facing side of the panel to prevent water stains. The primer coating contains a chelating agent which provides stain resistance to the coated face of the panel. Furthermore, the panel may incorporate both latex within its structure and the aforementioned primer coating to provide enhanced stain resistance to the panel.

In an example embodiment, a stain resistant acoustical panel includes fibers, starch and latex, wherein the latex comprises from about 0.01% to 0.97% of the panel on a dry weight percent basis, and preferably from about 0.01% to about 0.5%. The latex may include a functional group such as carboxylic acid, methylol, hydroxyl, urethane and an amide. The carboxylic acid may comprise between about 0.02% to about 7% by dry weight of the latex.

In a second example embodiment, the stain resistant acoustical panel includes at least one side of the panel coated with a primer that includes a chelating agent. The chelating agent may be a metal oxide such as zinc oxide, aluminum oxide and zirconium oxide. Additional examples of chelating agents include soluble zirconium, aluminum and zinc compounds. The primer coating may further include a binder and a filler. The binder can be a hydrophilic binder such as a starch, polyamides, polyacrylamides, proteins, polyvinyl alcohol, latex, polyureas and mixtures of the above. The binder may comprise between about 1% to about 40% dry weight of the primer coating. The filler may comprise between about 35% to about 99% by dry weight of the primer coating and may be chosen from the group of calcium carbonate, talc, perlite, dolomite, sand, barium sulfate, mica, silica, gypsum, wollastonite, calcite, aluminum trihydrate, zinc oxide, zinc sulfate, solid polymer particles, hollow beads and mixtures of the above.

In a third example embodiment, the stain resistant acoustical panel may incorporate both latex within its structure and a primer coating comprising a chelating agent. The primer coating works synergistically with the latex to further reinforce the anti-staining properties of the latex.

DETAILED DESCRIPTION

The present invention comprises a stain resistant acoustical panel wherein water may flow through the inner structure of the panel such that water may enter the back side of the panel and then exit the facing side of the panel. The panel may have incorporated within its structure a quantity of latex which forms an ultra thin coating within the fibrous panel. Instead of incorporating latex within its structure, the panel may have a coating or primer applied to at least one side of the panel. Typically, the coating is applied to the facing side of the panel. The coating contains a chelating agent which provides stain resistance to the coated face of the panel. Additionally, the panel may incorporate both latex within its structure and a primer coating comprising a chelating agent to provide enhanced stain resistance to the panel.

In a first example embodiment, a small amount of latex is added to the structure of the panel to prevent staining by incident water on the panel. The latex is typically added to the panel composition during the wet formation process but may be added when the panel has been dried. When added, the latex spreads forming an ultra thin coating within the panel and seals the staining agents by coating the fibers of the panel internally with an ultra thin film of water-impermeable thermoplastic, thus avoiding the leaching out of staining agents. Amounts of latex greater than 1% of the solids composition of the entire panel will make the board hydrophobic, thus hindering the water transport through the cross section of the panel. When latex is added in an amount greater than 1%, water will undesirably run over the panel edges. Thus, it has been determined that the amount of latex in the solids composition of the entire panel which will produce a panel that is stain resistant as well as hydrophilic is in the range from about 0.01 to 0.97, and preferably in the range from about 0.01 to about 0.5.

The resin latexes may be either anionically, cationically, or no-charge stabilized. For example, anionically stabilized resin emulsions typically have pH above 7. Some may contain a small proportion of ionizable functional groups such as carboxyl groups that may be at least partly neutralized to obtain negative charges in the emulsified particle. Cationically stabilized resin emulsions typically have quaternary ammonium moieties stable at all pH values, or contain amine groups that in an acid medium give a positively charged particle. No-charge stabilized resins typically contain hydrophobic resin compositions with a given amount of copolymerized polyvinyl alcohol moieties, the latter acting as the hydrophilic counterpart to produce some degree of surfactant character to the particle, thus the particle becomes stabilized in a water emulsion.

Starch, starch derivatives, or mixes thereof may be added to the panel composition as the binder to keep the panel composite coherently adhered. For example starch may include native starches, purified and non-purified starches, non-ionic starches, and derivatives include anionic, cationic, lipophilic, fat replacers, dextrins, carboxylated starch, ethoxylated starch, starch esters, hydroxyethylated starch and mixtures thereof. Of course there are other examples of starch which are fully contemplated and understood as being able to be incorporated with the present panel of the panel.

The combination of latex and starch comprises from about 1.5% to about 35%, or from about 1.5% to about 20% or from about 2% to about 18% of the entire panel, based on the total dry weight solids. The mixture of starch and latex alone includes starch in an amount from about 80% to 99.7%, or from 80.1% to about 95% or from 81% to about 90%, based on the total dry weight solids.

In an example embodiment, resin latexes with chemical functional groups that favor adhesion to the panel components and starch binder may be used. Examples of the chemical functional groups include carboxylic acid, methylol (from formaldehyde), hydroxyl, urethane, urea, and amide groups. For example, typical amounts of carboxylic acid contents (as acrylic acid) are from about 0.02% to 7% by weight of dry latex. This range is equivalent to 0.16 to 54.6 acid number expressed as mg of KOH per gram of dry latex polymer. Levels up to the point where the resin will be water soluble typically occurs at about 15% to 30% carboxyl content (as acrylic acid) depending on the resin latex. The latter range is equivalent to 117 to 195 acid number. When the resin becomes water soluble it flows through the panel and does not form an ultra thin impermeable coating.

Higher acid numbers, crosslinking of the polymer by means of covalent bonding or ionic bonding such as with zinc (II) and/or zirconium (IV) compounds can be used to render the polymer water-insoluble and therefore useful for this invention. Furthermore, hydrophobic latexes based on acrylic/styrene chemistry containing about 3% carboxyl acid functionality (as acrylic acid) with an acid number of 23 are highly effective to prevent staining of the panels caused by water transport through the panel.

The primer coating may be placed before applying the panel's decorative front face. The primer coating contains chelating agents in a coating composition to remove staining compounds that might have passed through the panel, particularly when the water itself is contaminated with staining compounds. Furthermore, the primer coating works synergistically with the latex in the board to further reinforce the anti-staining properties of the latex. The primer coating composition basically includes a binder, filler, and the chelating complexing agents that chelate the staining compounds carried by the water. Other compounds can be added, such as, but not limited to, surfactants, dispersant agents, pigments, buffer agents, and viscosity controllers.

Different compatible fillers can be added. For example, typical fillers can include calcium carbonate, talcs, platy talcs, perlite, dolomite, sand, barium sulfate, mica, silica, gypsum, wollastonite, calcite, aluminum trihydrate, zinc oxide, zinc sulfate, solid polymer particles, hollow beads, and mixtures thereof. The range of incorporation in the composition may be from about 35% to about 99.4%, from 79% to 96% and from 88% to 94% solids by weight of dry primer coating.

The binders for this invention are hydrophilic. The hydrophilic binder, being water compatible and in some cases slightly water-soluble allows the absorption of water and water-soluble staining compounds within the whole extension of the primer coating itself. This brings forth a wide distribution of water into the body of the hydrophilic acoustical panel before it reaches the panel front face as well as an effective removal of staining compounds from the water by the primer coating, thus avoiding localized flow of water into a relatively small portion of the primer coating.

An example of hydrophilic binders includes starches and starch-based compounds; polyamides such as polyacrylamides, polymethacrylamides, proteins; polyvinyl alcohol compounds; latex emulsions in water or polymers where the resin contains a large proportion of carboxyl or similar hydrophilic groups; polyureas; and the like. Preferred binders include starch and starch-based compounds. The range of incorporation in the composition is from 0.5% to 40%, preferably from 3% to 9% and most preferably from 4% to 7% solids by weight of dry primer coating.

Chelating agents are compounds that can perform strong chemical complexation with staining compounds. Staining compounds cause aesthetical damage to the panel decorative front face. The chemical nature of these staining compounds is not known but it is believed that organic and inorganic mixtures of compounds are present in the stain, such as scorched starch, iron compounds, dyes from the newspapers used as source of cellulosic fibers.

Example chelating agents include tannin stain inhibitors available from (Halox Corporation, Hammond, Ind., USA). Such formulations comprise soluble zirconium, aluminum, and zinc at a pH above 7. These tannin stain inhibitors form insoluble chelated tannins that stop the migration of soluble tannins towards the decorative wood paint. Examples include XTAIN L-44 (30% solids in water-based formulation), XTAIN A, BW-100, and CZ-170, each available from Halox Corporation, Hammond, Ind., USA. Typical binders for the above example chelating agents include hydrophobic polymers such as polyvinyl acetate, vinyl acrylics, straight acrylics, latex emulsions, and solvent based alkyds, where the solvent based alkyds are the most effective to stop the migration of tannins and the polyvinyl acetate the least effective.

Furthermore, the chelating agent may comprise soluble or insoluble metal salts and oxides can also be used for the present invention in place of the commercial proprietary formulations cited above. Examples include zinc oxide, aluminum oxide (chromatographic, ordinary, adsorbent grade, etc.), zirconium oxide, and mixes thereof. Soluble salts of aluminum, zinc, zirconium, and the like, mixes thereof, or in combination with chelating metal oxides can also be used. The range of incorporation of chelating agent in the coating composition is from about 0.1% to 25%, from about 1% to 12% or from about 2% to 5% solids by weight of dry primer coating. The final dispersion may be well shaken or stirred before use.

For the primer, the application rate range of dry solids is from about 1 g/sq.ft. to about 180 g/sq.ft. of substrate geographical surface, with preferred range from 5 g/sq.ft. to 30 g/sq.ft., and most preferred from 7 g/sq.ft. to 15 g/sq.ft. The primer is applied on the acoustical panel surface before the application of the final decorative panel face. Other intermediate primers or paint coatings that fulfill specific purposes can also be applied before or after the application of the chelating primer.

Acoustical Panels

Acoustical panels comprise a large variety of materials with varied applications. Acoustical panels may include glass fiber, mineral fiber, gypsum, vinyl-coated-gypsum, mixtures thereof, metal, ceramic materials, wood, plastic, and the like. Additionally, the panels may include fillers, dispersing compounds, flocculants, pigments, binders, and many other materials organic and inorganic to introduce specific properties to the acoustical panel. Applications for the acoustical panels include ceiling panels, support grids for ceiling panels, walls, partition boards, and panels. Paints for acoustical panels can have varied compositions to impart the specific properties desired for the panel. Paints may impart specific properties to the surface of the panel such as porosity, smoothness, a rough and irregular surface. The panel may be punched with holes, fissures and other patterns to modify and improve acoustical properties.

Surface-Active Agents

Wetting of surfaces, particularly by the chelating primer compositions can be an important factor for further enhancement of the spreadability and adhesion of the chelating primer compositions on the acoustical ceiling panels, thus enhancing the overall performance of the coated surface. Also, the surface-active agent favors the dispersion and stability of the suspended particles such as fillers. Further wetting of other additives such as pigments is also favored by the addition of the surface-active agent.

Other Additives

Compositions or compounds that fulfill specific tasks may be added to the primer coating composition. Without limiting the invention, examples of such compositions or compounds include dispersants, defoamers, antioxidants, pigments, light-scattering pigments, solvents, viscosity affecting agents, stabilizers, biocides, and pH-controlling buffers that can be added to the composition to enhance performance or processing.

Coating Process and Methods

The chelating primer composition can be applied to a surface of acoustical panels by spraying, dip-coating, spin-coating, brush painting, roll coating, knife coating, and curtain coating. The composition can be applied to a large variety of acoustical panel surfaces. After drying and/or thermally curing the chelating primer coating, the composition typically forms an adherent coating.

One way to control coating thickness is by altering the percent solids (by weight) of the chelating primer dispersion that contains all the additives and surface-active agents. The percent solids can be from 1% to 90%, preferably from 25% to 75% wt. %, and most preferably from 40% to 60% of the dispersion. Another way to control coating thickness is by altering the amount of dispersion placed on the substrate surface. Water may be used as a suspending liquid, however, other solvents may be used in combination with water.

Once applied to the surface, the chelating primer coating is permitted to dry and/or cure. This can be done at ambient temperature, or may be heated in a convection oven or preferably in a forced-air draft oven to assist or shorten the drying and/or curing process. The range of temperatures is from ambient temperature to 250° C., preferably from 50° to 225° C. and most preferably from 60° to 200° C. Optionally, an infrared oven, a heating gun, a microwave oven, an infrared laser, or other sources of thermal energy can also be used as the source of heat for coating drying and/or curing.

Applications

Acoustical panels include, without limiting the invention, ceiling panels, walls, partition boards, panels, and the like. Acoustical panel paints can have varied compositions to impart the specific properties desired for the panel.

EXAMPLES

Testing Procedures

In the following examples, certain antistaining properties of the latex-containing acoustical panels and/or applied chelating primer discussed above were determined using the following procedures.

Stain Resistance

This test is carried out to measure the stain resistance of the acoustical panel. Staining is typically caused by water dripping on the back face of the panel. Water permeates the panel and goes through it dissolving staining materials contained in the panel from the binder composition and other contaminants contained within the panel such as newspaper printing inks. In addition, the water itself may contain staining materials before going through the panel.

In the experiment, from a 100 ml chemical biuret, 20 ml of water are allowed to drip in one hour onto the back face of an acoustical panel. The panel is horizontally positioned. Test panel dimensions are 2 ft. by 2 ft. The tip of the biuret is about one foot away from the test panel. The cycle is repeated every 24 hours until staining appears on the decorative panel front face. Even a minimal amount of visible stain is considered a failure and the test is terminated. Time for appearance of staining is measured in days and recorded. In addition, a stain rating is also recorded as well as the time in days that it takes for the decorative panel front face to appear visibly wet. The stain rating is as follows:

| | |
|---|---|
| No stain = | 5 |
| Slight stain = | 4 |
| Moderate stain = | 3 |
| Extensive stain = | 2 |
| Very extensive stain = | 1 |
| Disastrous stain = | 0 |

The test is run with panels having a white decorative front face to make the test more astringent in the detection of incipient stains.

Example 1

Commercial product acoustical panel Minaboard, generic white, fine fissured with punched acoustical holes available from Armstrong World Industries, Lancaster, Pa., USA was used in all testing that follows described in every one of the Examples. The panels were manufactured following the procedural teachings of U.S. Pat. No. 4,963,603 and U.S. Pat. No. 5,277,762. The starch content was 2.1% by weight of dry panel solids. The latex emulsion was Rhoplex EWP-466 available from Rohm and Haas Co., Philadelphia, Pa., USA, a carboxylic acid/styrene/acrylic terpolymer with a low content of carboxylic acid (acid number of 23 equivalent to 2.95% of acrylic acid on dry basis). The dry weight of latex was 0.35% of the total weight of dry panel solids. In Example 1, the dry latex content is 14.3% of the latex-starch composition based on the dry weight of total latex and starch solids. Rhoplex EWP-466 latex is one of the most hydrophobic carboxylated acrylic thermoplastics typically available commercially. The carboxyl groups act as an anchor to attach to the relatively hydrophilic panel components. The panels were dried, primer coatings applied and then decoratively painted on the front face. The panel properties for the latex-treated panel and a comparison of results with an untreated control are shown in Table 1.

TABLE 1

Comparison of latex-treated (Rhoplex EWP-466 latex) fine fissure Minaboard acoustical ceiling panel vs. an untreated control.

|  | Latex-treated Minaboard | Control Minaboard |
| --- | --- | --- |
| Time for stain appearance | 49 days | 1 day |
| Stain rating at first appearance | 4–5 | 1 |
| Time for front-face to appear wet | 45 days | 10 minutes |

Table 1 shows the high stain resistance conferred by the introduction of a small amount of carboxylated styrene/acrylic latex. Table 1 also shows that the water flow through is kept, although at a diminished rate. This gives more time for the water to diffuse throughout the panel as shown by a time of 45 days before the water wets the front panel decorative face as compared with only 10 minutes for the control. Neither for the control nor for the test panel, water dripping on the back of the panel ran over the panel edge.

Comparative Example 1

As in Example 1, except that the dry weight of latex Rhoplex EWP-466 was 1% of dry panel solids. Here the dry latex content was 32.3% of the latex-starch composition based on the dry weight of total latex and starch solids. For the staining test, the water remained on the back surface of the panel and did not flow through the panel, thus running laterally over the panel edges. The panel was internally completely sealed to flow of water by the latex at said concentration.

Example 2

The same as Example 1, except that Rhoplex EWP-466 latex was substituted by Airflex 4530 latex (Air Products and Chemicals, Inc., Allentown, Pa., USA). The Airflex 4530 latex dry weight was at a concentration of 0.5% of dry panel solids. In this Example 2, the dry latex content is 19.2% of the latex-starch composition based on the dry weight of total latex and starch solids. Airflex 4530 is a terpolymer of ethylene/vinylchloride/acrylamide with 2% of acrylamide by weight of dry solids. Time for front-face to appear wet was 20 minutes Time for stain appearance was 2 days, and stain rating was 3.

Example 2 shows that amide groups in a hydrophobic polymer are less effective than carboxylic groups (Example 1) to impart antistain properties to the acoustical panel. This is believed to be due to the lesser adhesive properties of amide functional groups towards panel components thus causing a significantly decreased tendency to form a protective film inside of the acoustical panel when compared with carboxylated styrene/acrylic Rhoplex EWP-466.

Example 3 a) Chelating Primer Coating

A chelating primer-coating composition was prepared by adding to a reactor, with strong stirring, and in the order mentioned, 3680 g of deionized water; 268 g. of Ethylex 2025 powder (starch-based compound, water soluble) (A.E. Haley Mfg, Co., Daphne, Ala., USA); 499 g. of XTAIN L-44 (chelating agents, 30% solids in water) (Halox Corporation, Hammond, Ind., USA); 5,460 g of Hydrocarb 60 slurry (calcium carbonate 70% solids in water) (OMYA, Inc., Proctor, Vt., USA); 27 g of Metasol D3T-A (liquid biocide) (Calgon Corp., Harleysville, Pa., USA); 7.0 g of Colloid 797 (liquid defoamer) (Rhone Poulenc, Marietta, Ga., USA); and 59 g of Natrosol FPS-HB (liquid thickener, 25% solids) (Aqualon Co., Wilmington, Del., USA).

b) Primer-Coating Control Without Chelating Agents

Same as in (a) above but without XTAIN-L44.

c) Coating Procedure. Test Sample

An uncoated bare board commercial acoustical panel Minaboard, fine fissured with punched acoustical holes (Armstrong World Industries, Lancaster, Pa., USA) was spray coated on the panel face with primer-coating composition described in (a) containing chelating agents. The coating was dried and cured at 350° F. for 10 minutes. The weight of the dry coating was 9 g/sq.ft. Then a second primer coating was applied with the composition described in (b) (no chelating agents). The coating was dried and cured at 350° F. for 10 minutes. The weight of the second primer coating was 18 g/sq.ft. on dry coating composition basis. Finally, the standard commercial decorative face paint generic white was applied to the panel and dried at 310° F. for 8 minutes.

d) Coating Procedure. Control Panel

A control panel identical to the one described in (c) above was prepared. The procedure was identical except that none of the two primer-coatings contained chelating composition. Both layers of coating were identical, and each coating weighed 9 g/sq.ft on dry basis. Results are shown in Table 2 for a comparison of a test Minaboard panel chelating primer-coated and a control chelating-untreated Minaboard panel.

TABLE 2

Comparison of chelating primer-coated fine fissure Minaboard acoustical ceiling panel vs. an untreated control.

|  | Primer-coated Minaboard | Control Minaboard |
| --- | --- | --- |
| Time for stain appearance | 7 days | 1 day |
| Stain rating at first appearance | 2 | 1 |
| Time for front-face to appear wet | 4 days | 10 minutes |

Table 2 shows that the chelating primer coating is an effective agent to remove stains caused by staining agents within the acoustical panel.

Example 4

To demonstrate the synergism between internally latex-treated panel and chelating primer-coated panel, a Minaboard panel described in Example 1 was treated following the procedure of said Example 1 and afterwards a chelating primer-coating was placed following Example 3. Table 3 shows the results of this test.

TABLE 3

Comparison of latex-treated (Rhoplex EWP-466)-chelating primer-coated fine fissure Minaboard acoustical ceiling panel vs. an untreated control.

|  | Latex and chelating primer-coated | Control Minaboard panel |
|---|---|---|
| Time for stain appearance | larger than 56 days* | 1 day |
| Stain rating at first appearance | 5 (no stain) | 1 |
| Time for front-face to appear wet | larger than 56 days* | 10 minutes |

*Test interrupted due to length of time. The synergistic effect between the latex-treated panel and the chelating primer-coating on the front face avoided any appearance of stain and prevented the appearance of wetness on the decorative panel front face, even when there was water flow through the panel. No water went over the panel edges.

While Applicants have set forth embodiments as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

We claim:

1. A panel comprising:

fibers;

starch; and latex, wherein the latex is incorporated within the panel in an amount from about 0.01% to 0.97% by weight on a dry weight percent basis and forms an ultra thin, water-impermeable coating on the fibers within the panel such that water may flow through a cross section of the panel.

2. The panel of claim 1, wherein the latex further comprises a functional group selected from the group consisting of carboxylic acid, methylol, hydroxyl, urethane, amide, urea and combinations thereof.

3. The panel of claim 2, wherein carboxylic acid comprises from about 0.02% to about 7% by weight of the latex.

4. The panel of claim 1, wherein the latex comprises from about 0.01% to about 0.5% by weight on a dry weight percent basis.

5. A coated panel comprising:

fibers;

starch;

a latex, wherein the latex is incorporated within the panel in an amount from about 0.01% to 0.97% by weight on a dry weight percent basis and forms an ultra thin, water-impermeable coating on the fibers within the panel such that water may flow through a cross section of the panel; and a coating including a chelating agent applied to a facing side of the panel.

6. The panel of claim 5, wherein the coating further comprises a binder and a filler.

7. The panel of claim 5, wherein the latex further comprises a functional group selected from the group consisting of carboxylic acid, methylol, hydroxyl, urethane, amide, urea and combinations thereof.

8. The panel of claim 7, wherein carboxylic acid comprises from about 0.02% to about 7% by weight of the latex.

9. The panel of claim 5, wherein the latex comprises from about 0.01% to about 0.5% by weight on a dry weight percent basis.

* * * * *